(12) United States Patent
Martin et al.

(10) Patent No.: US 9,151,440 B1
(45) Date of Patent: Oct. 6, 2015

(54) INSECT REPELLANT HEATER SUPPORT ASSEMBLY

(71) Applicants: Dennis Martin, Kings Mountain, NC (US); Jeff Hamm, Kings Mountain, NC (US)

(72) Inventors: Dennis Martin, Kings Mountain, NC (US); Jeff Hamm, Kings Mountain, NC (US)

( * ) Notice: Subject to any disclaimer, the term of this patent is extended or adjusted under 35 U.S.C. 154(b) by 208 days.

(21) Appl. No.: 13/731,146

(22) Filed: Dec. 31, 2012

(51) Int. Cl.
*F16M 13/02* (2006.01)

(52) U.S. Cl.
CPC ............. *F16M 13/022* (2013.01); *F16M 13/02* (2013.01)

(58) Field of Classification Search
CPC ..... F16M 13/02; F16M 13/022; A47B 96/06; G09F 7/18; G09F 17/00; F21V 21/116
USPC ........... 248/316.4, 684, 689, 690, 175, 216.1, 248/218.1, 217.2, 217.3, 218.2, 217.4, 248/218.4, 219.1, 219.2, 219.3, 229.14, 248/229.24, 228.5, 230.5, 231.61, 231.85, 248/340
See application file for complete search history.

(56) References Cited

U.S. PATENT DOCUMENTS

| | | | | |
|---|---|---|---|---|
| 1,205,615 A * | 11/1916 | Gebauer | ................... | 248/218.1 |
| 1,972,505 A * | 9/1934 | Wilson | ................... | 248/218.2 |
| 3,158,348 A * | 11/1964 | Rutter | .................. | 248/240.4 |
| 3,477,586 A * | 11/1969 | Haluska | .................. | 211/64 |
| 3,776,498 A * | 12/1973 | Peters et al. | ............... | 248/219.1 |
| 4,518,141 A * | 5/1985 | Parkin | ........................ | 248/546 |
| 4,697,669 A * | 10/1987 | Bergsten | ......................... | 182/92 |
| 4,729,535 A * | 3/1988 | Frazier et al. | .............. | 248/230.4 |
| D348,215 S | 6/1994 | Melhorn | | |
| 5,437,377 A * | 8/1995 | Riemenschneider | ...... | 211/86.01 |
| 5,482,241 A * | 1/1996 | Oglesby | ..................... | 248/309.1 |
| 5,495,969 A * | 3/1996 | Cardenas | ...................... | 224/275 |
| 5,680,939 A * | 10/1997 | Oliver | ............................ | 211/64 |
| 5,692,716 A * | 12/1997 | Himmelsbach | ............ | 248/216.1 |
| 5,967,475 A * | 10/1999 | Johnson | .................... | 248/217.4 |
| 6,029,386 A | 2/2000 | Globig | | |
| 6,935,065 B1 * | 8/2005 | Oliver | ............................... | 42/94 |
| 7,163,183 B2 * | 1/2007 | Sutherland et al. | ........ | 248/309.1 |
| 7,258,310 B2 * | 8/2007 | Norris | ........................ | 248/125.7 |
| 7,850,140 B2 * | 12/2010 | Jacobs et al. | .................. | 248/689 |
| 7,861,987 B2 * | 1/2011 | Gorsuch et al. | ............ | 248/219.1 |
| 7,975,973 B1 | 7/2011 | Weeden | | |
| 8,016,134 B1 | 9/2011 | Templin et al. | | |
| 8,087,195 B2 | 1/2012 | Minges | | |
| 8,231,095 B2 * | 7/2012 | Bean | ............................. | 248/323 |
| 8,336,837 B2 * | 12/2012 | Gephart et al. | ............ | 248/218.4 |
| 2007/0205344 A1 * | 9/2007 | Liermann et al. | .......... | 248/217.3 |
| 2007/0267556 A1 * | 11/2007 | Herskovic | ................. | 248/218.4 |
| 2010/0314514 A1 * | 12/2010 | Nelson | ....................... | 248/219.1 |
| 2013/0193287 A1 * | 8/2013 | Murphy | ...................... | 248/219.1 |

* cited by examiner

*Primary Examiner* — Nkeisha Smith

(57) ABSTRACT

An insect repellant heater support assembly includes a mount including a first end, a second end, a first lateral edge and a second lateral edge. A coupler is attached to the mount and is positioned nearer to the first end than the second end. The coupler releasably engages a heater. A bracket is attached to the mount and attaches the mount to a post such that the mount is horizontally oriented. A screw is attached to the mount and extends away from the second end. The screw is extendable into and threadably engageable with a tree. The screw has a longitudinal axis lying in a plane is co-planar with the mount.

5 Claims, 5 Drawing Sheets

INSECT REPELLANT HEATER SUPPORT ASSEMBLY

BACKGROUND OF THE DISCLOSURE

Field of the Disclosure

The disclosure relates to insect repellant mounting devices and more particularly pertains to a new insect repellant mounting device for holding a heater in a horizontal orientation such that it may effectively heat insect repellant.

SUMMARY OF THE DISCLOSURE

An embodiment of the disclosure meets the needs presented above by generally comprising a mount including a first end, a second end, a first lateral edge and a second lateral edge. A coupler is attached to the mount and is positioned nearer to the first end than the second end. The coupler is configured to releasably engage a heater. A bracket is attached to the mount and is configured to attach the mount to a post such that the mount is horizontally oriented. A screw is attached to the mount and extends away from the second end. The screw is extendable into and threadably engageable with a tree. The screw has a longitudinal axis lying in a plane is co-planar with the mount.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
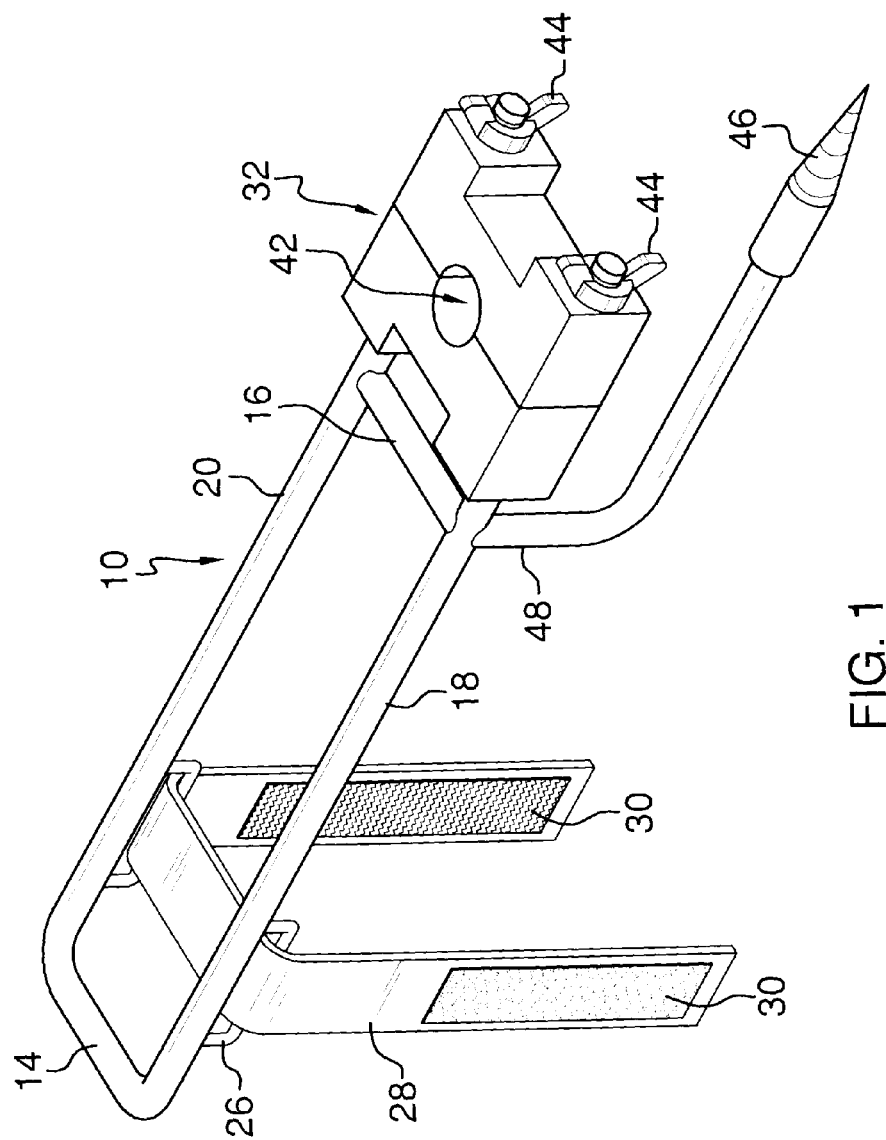
FIG. 1 is a top perspective view of a insect repellant heater support assembly according to an embodiment of the disclosure.
Figure 2:
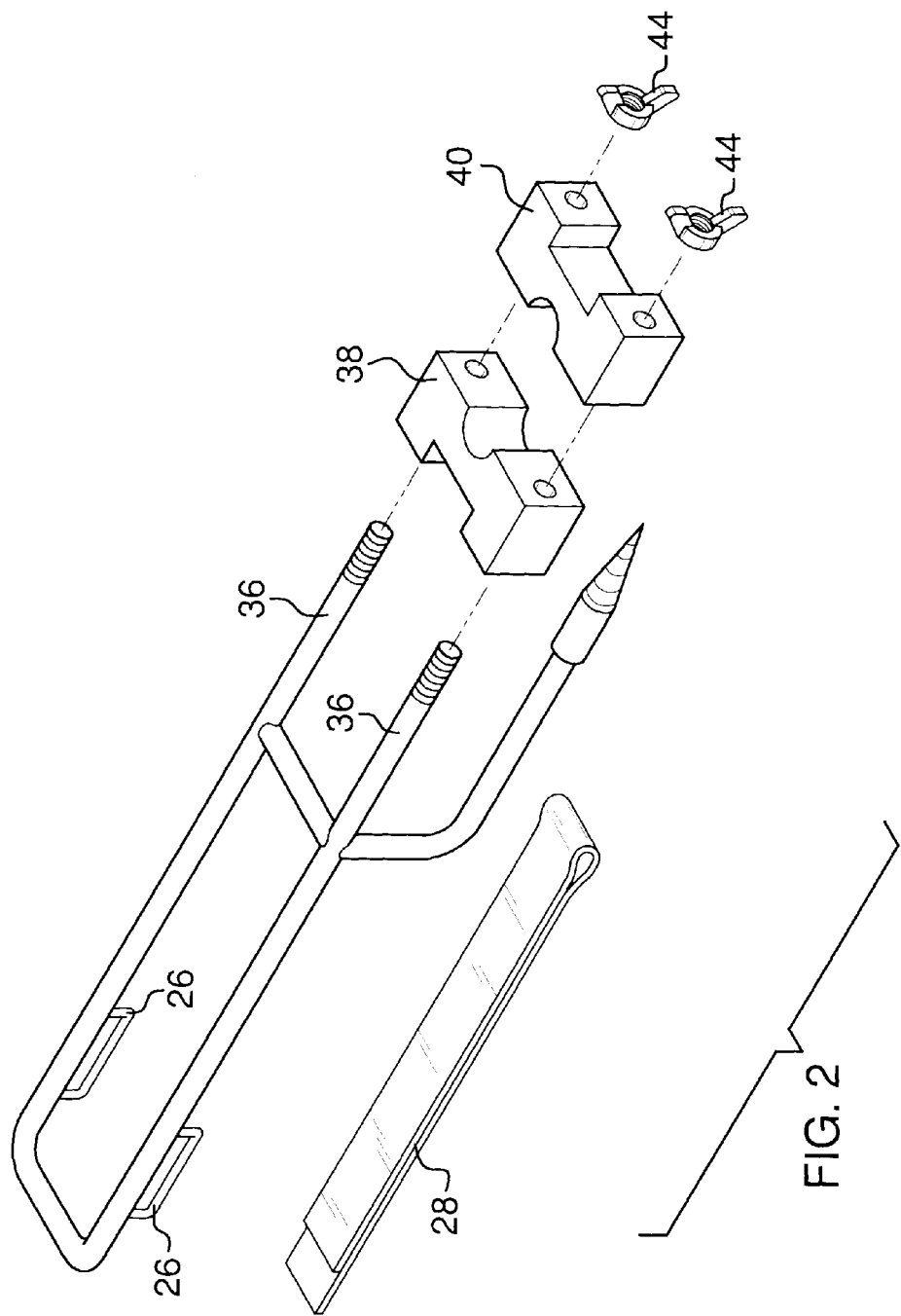
FIG. 2 is an exploded perspective view of an embodiment of the disclosure.
Figure 3:
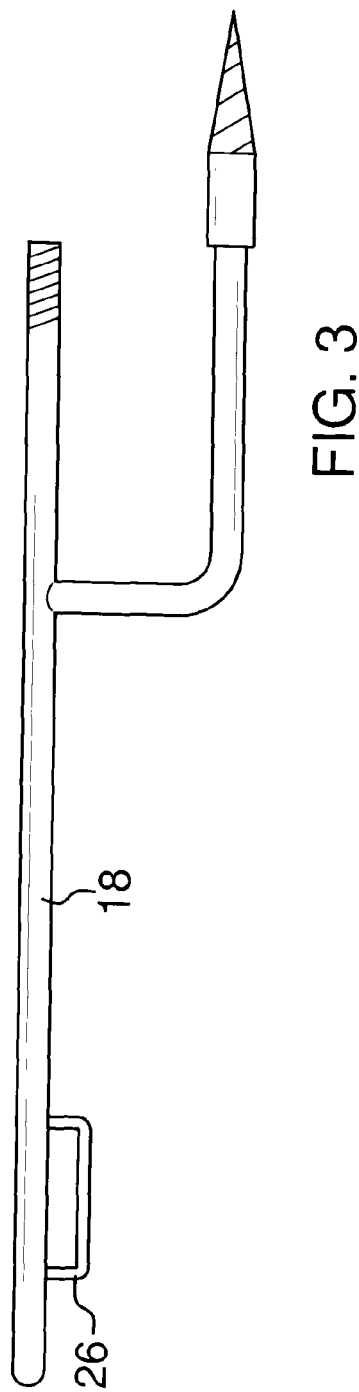
FIG. 3 is a side view of an embodiment of the disclosure.
Figure 4:
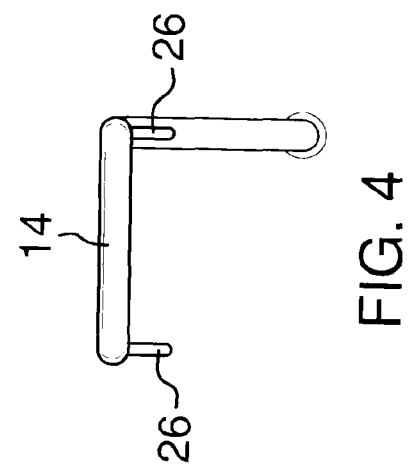
FIG. 4 is a rear view of an embodiment of the disclosure.
Figure 5:
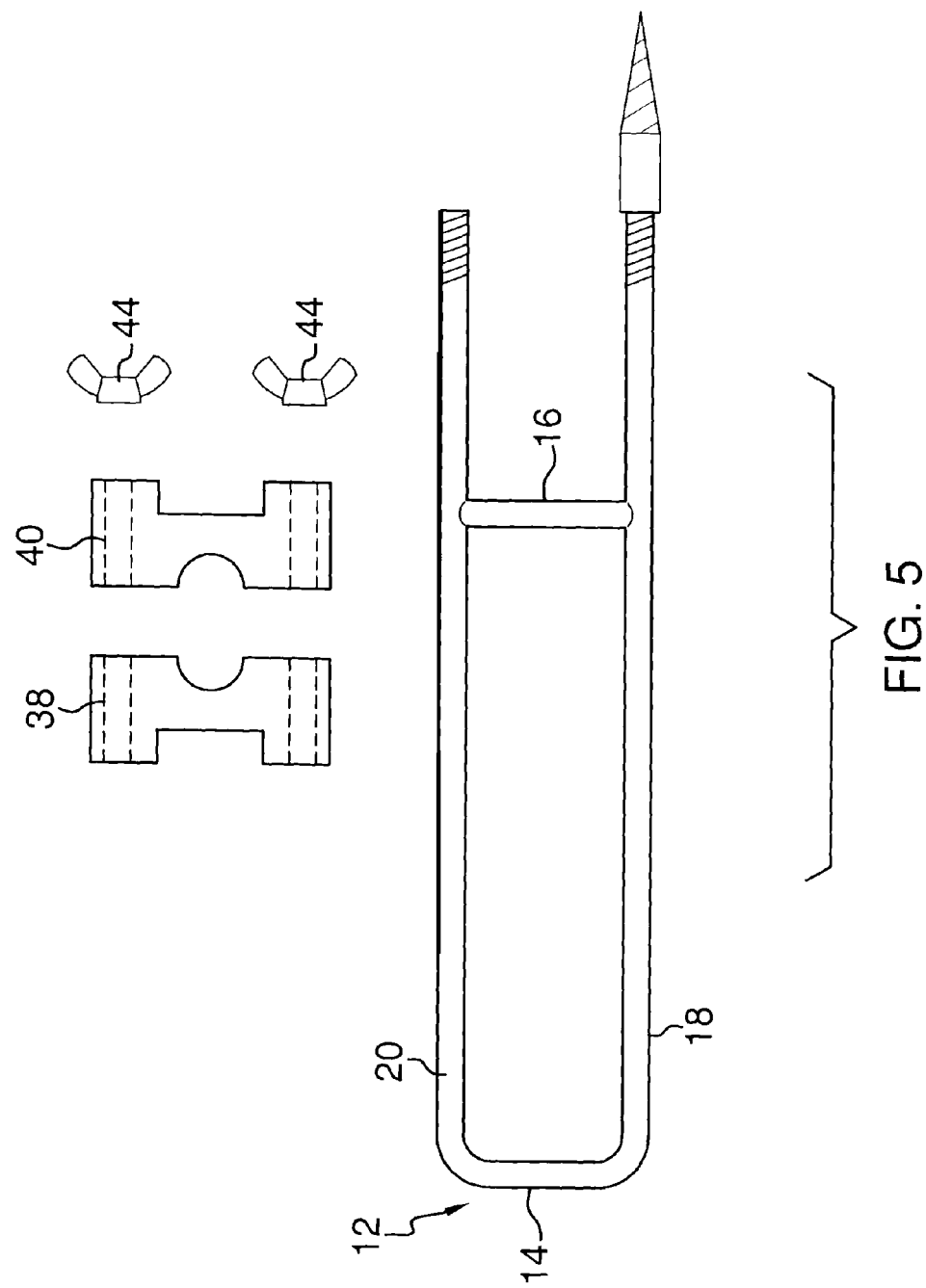
FIG. 5 is a top view of an embodiment of the disclosure.
Figure 6:
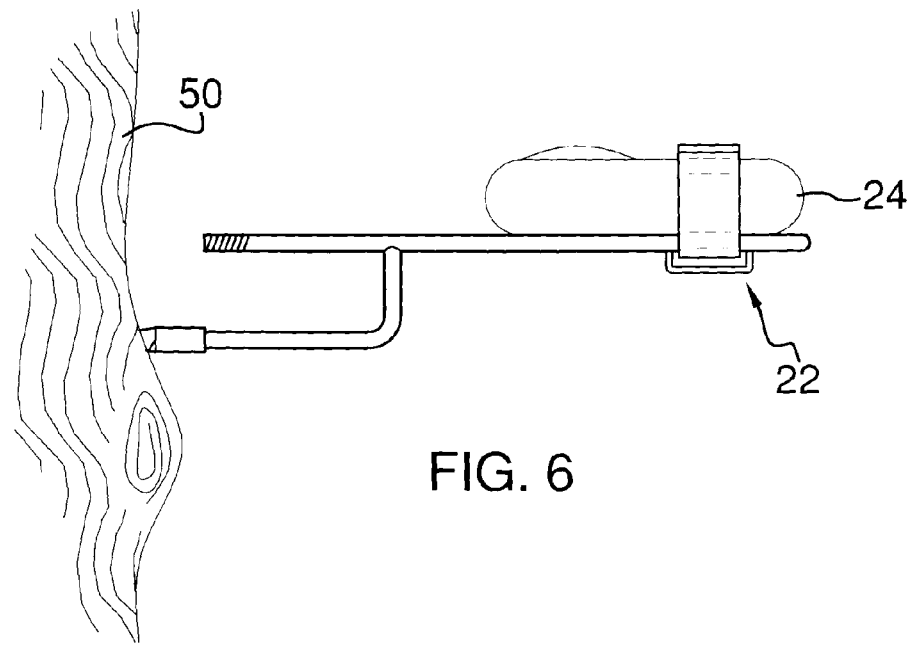
FIG. 6 is a side in-use view of an embodiment of the disclosure.
Figure 7:
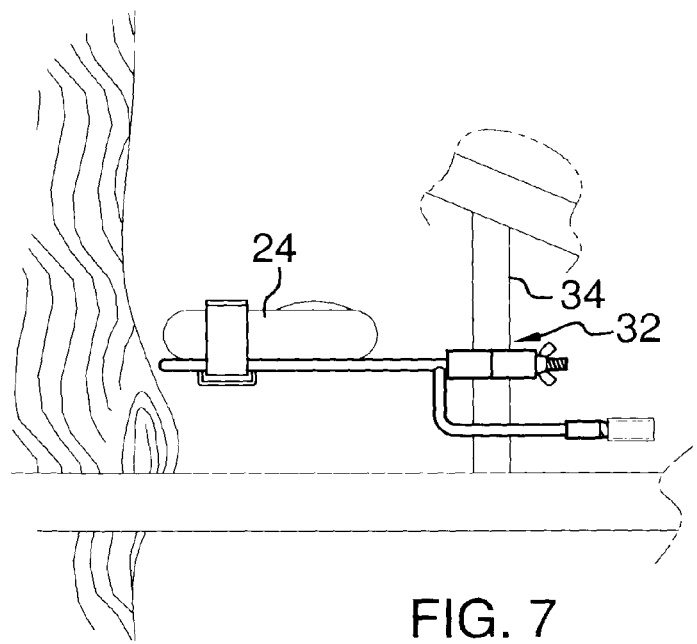
FIG. 7 is a side in-use view of an embodiment of the disclosure.

With reference now to the drawings, and in particular to FIGS. 1 through 7 thereof, a new insect repellant mounting device embodying the principles and concepts of an embodiment of the disclosure and generally designated by the reference numeral 10 will be described.

As best illustrated in FIGS. 1 through 7, the insect repellant heater support assembly 10 generally comprises a mount 12 including a first end 14, a second end 16, a first lateral edge 18 and a second lateral edge 20. The mount 12 may have a length from the first end 14 to the second end 16 between 5.0 inches and 8.0 inches and a distance between the first lateral edge 18 and the second lateral edge 20 between 1.50 inches and 2.50 inches. The mount 12 may be formed of a frame having a pair of elongated lateral members and a pair of end members.

A coupler 22 is attached to the mount 12. The coupler 22 is positioned nearer to the first end 14 than the second end 16 and is configured to releasably engage a heater 24. The coupler 22 may include a loop 26 attached to the mount 12 and a strap 28 extending through the loop 26. The strap 28 is extendable around the heater 24. The strap 28 may include a pair of mating members 30 releasably attachable to each other to retain the strap 28 in a closed loop extending around the heater 24. The mating members 30 may include hook and loop mating members. The loop 26 may be attached to a bottom side of the mount 12. Alternatively, the strap 28 may be attached directly to the mount 12 or may include a single piece of resiliently stretchable material.

A bracket 32 is attached to the mount 12 and is configured to attach the mount 12 to a post 34. The post 34 may include a vertically oriented post such as would be found on a tree stand typically used for hunting. The bracket 32 is attached to the second end 16. The bracket 32 may include a pair of arms 36 attached to the second end 16. A first saddle 38 is mounted on the arms 36 and a second saddle 40 is removably mounted on the arms 36. The first saddle 38 may also be removable from the arms 36. An opening 42 is formed at a juncture of the first 38 and second 40 saddles which has an axis oriented perpendicular to a plane of the mount 12. The plane of the mount 12 extends through each of the first 14 and second 16 ends and the first 18 and second 20 lateral edges. The post 34 is positionable in the opening 42. The arms 36 are threaded and a pair of fasteners 44 is removable positioned on the arms 36 to retain the first 38 and second 40 saddles on the arms 36.

A screw 46 is attached to the mount 12 and extends away from the second end 16. The screw 46 is extendable into and threadably engageable with a tree 50. This allows the mount 12 to be secured to a tree 50 adjacent to a hunter should a suitable post 34 not be available. The screw 46 has a longitudinal axis lying in a plane is co-planar with the mount 12. The screw 46 is positioned nearer to the first lateral edge 18 than the second lateral edge 20 to be spaced from an axis of the opening 42. More specifically, the screw 46 may be mounted on a leg 48 attached to and extending downwardly from the mount 12 adjacent to the first lateral edge 18 and the second end 16.

In use, the mount 12 is attached to a post 34 or to a tree 50 as described above. Once the mount 12 is horizontally oriented, a heater 24 for heating insect repellant is secured to the mount 12. Such heaters 24, or heat emitters, are conventional such as those known as ThermaCell and provided by The Schawbel Corporation, 26 Crosby Drive, Bedford, Mass. 01730. These heaters 24 operate most efficiently when retained in a horizontal orientation. The assembly 10 ensures that the heater 24 will remain in such a position and will also provide for a convenient mounting location for the heater 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A support assembly configured to retain a heater for heating insect repellant in a horizontal orientation, said assembly including:
- a mount including a first end, a second end, a first lateral edge and a second lateral edge;
- a coupler being attached to said mount, said coupler being positioned nearer to said first end than said second end, said coupler being configured to releasably engage a heater;
- a bracket being attached to said mount and being configured to attach said mount to a post such that said mount is horizontally oriented; and
- a screw being attached to said mount and extending away from said second end, said screw being extendable into and threadably engageable with a tree, said screw having a longitudinal axis lying in a plane being co-planar with said mount; and
- wherein said coupler includes a loop attached to said mount and a strap extending through said loop, said strap being extendable around said heater, said strap including a pair of mating members releasably attachable to each other to retain said strap in a closed loop extending around the heater, said loop being attached to a bottom side of said mount.

2. The support assembly according to claim 1, wherein said mount has a length from said first end to said second end between 5.0 inches and 8.0 inches, a distance between said first lateral edge and said second lateral edge between 1.50 inches and 2.50 inches.

3. The support assembly according to claim 1, wherein said screw is positioned nearer to said first lateral edge than said second lateral edge.

4. A support assembly configured to retain a heater for heating insect repellant in a horizontal orientation, said assembly including:
- a mount including a first end, a second end, a first lateral edge and a second lateral edge, said mount having a length from said first end to said second end between 5.0 inches and 8.0 inches, a distance between said first lateral edge and said second lateral edge between 1.50 inches and 2.50 inches;
- a coupler being attached to said mount, said coupler being positioned nearer to said first end than said second end, said coupler being configured to releasably engage a heater, said coupler including a loop attached to said mount and a strap extending through said loop, said strap being extendable around said heater, said strap including a pair of mating members releasably attachable to each other to retain said strap in a closed loop extending around the heater, said loop being attached to a bottom side of said mount;
- a bracket being attached to said mount and being configured to attach said mount to a post, said bracket being attached to said second end, said bracket including:
  - a pair of arms being attached to said second end;
  - a first saddle being mounted on said arms;
  - a second saddle being removably mounted on said arms, an opening being formed at a juncture of said first and second saddles, said opening having an axis oriented perpendicular to a plane of said mount,
  - wherein the post is positionable in said opening;
  - a pair of fasteners being removable positioned on said arms to retain said first and second saddles on said arms; and
- a screw being attached to said mount and extending away from said second end, said screw being extendable into and threadably engageable with a tree, said screw having a longitudinal axis lying in a plane being co-planar with said mount, said screw being positioned nearer to said first lateral edge than said second lateral edge.

5. A support assembly configured to retain a heater for heating insect repellant in a horizontal orientation, said assembly including:
- a mount including a first end, a second end, a first lateral edge and a second lateral edge;
- a coupler being attached to said mount, said coupler being positioned nearer to said first end than said second end, said coupler being configured to releasably engage a heater;
- a bracket being attached to said mount and being configured to attach said mount to a post such that said mount is horizontally oriented;
- a screw being attached to said mount and extending away from said second end, said screw being extendable into and threadably engageable with a tree, said screw having a longitudinal axis lying in a plane being co-planar with said mount; and
- wherein said bracket includes
  - a pair of arms being attached to said second end,
  - a first saddle being mounted on said arms,
  - a second saddle being removably mounted on said arms, an opening being formed at a juncture of said first and second saddles, said opening having an axis oriented perpendicular to said plane of said mount, wherein the post is positionable in said opening, and
  - a pair of fasteners being removable positioned on said arms to retain said first and second saddles on said arms.

* * * * *